(12) United States Patent
Heismann

(10) Patent No.: US 7,477,765 B2
(45) Date of Patent: Jan. 13, 2009

(54) METHOD FOR VISUALLY DISPLAYING QUANTITATIVE INFORMATION IN MEDICAL IMAGING DATA RECORDS

(75) Inventor: Bjoern Heismann, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 875 days.

(21) Appl. No.: 11/060,481

(22) Filed: Feb. 18, 2005

(65) Prior Publication Data

US 2005/0185829 A1    Aug. 25, 2005

(30) Foreign Application Priority Data

Feb. 20, 2004 (DE) .................. 10 2004 008 519

(51) Int. Cl.
*G06K 9/00* (2006.01)
(52) U.S. Cl. .......................... 382/128; 378/53
(58) Field of Classification Search ................. 382/128, 382/131, 132; 378/4, 53, 54, 62
See application file for complete search history.

(56) References Cited

U.S. PATENT DOCUMENTS

| | | | |
|---|---|---|---|
| 7,050,530 B2 * | 5/2006 | Heismann | 378/5 |
| 7,050,533 B2 * | 5/2006 | Heismann et al. | 378/53 |
| 7,158,611 B2 * | 1/2007 | Heismann et al. | 378/98.9 |
| 7,319,739 B2 * | 1/2008 | Heismann | 378/62 |
| 2004/0218728 A1 * | 11/2004 | Heismann | 378/207 |

FOREIGN PATENT DOCUMENTS

| | | |
|---|---|---|
| DE | 101 27 573 A1 | 12/2001 |
| DE | 101 43 131 A1 | 4/2003 |
| DE | 103 11 628 A1 | 10/2004 |

OTHER PUBLICATIONS

B.J. Heismann et al., "Density and atomic number measurements with spectral x-ray attenuation method", Journal of Applied Physics, vol. 94. No. 3, Aug. 1, 2003, pp. 2073-2079.

* cited by examiner

*Primary Examiner*—Andrew W Johns
(74) *Attorney, Agent, or Firm*—Harness, Dickey & Pierce, P.L.C.

(57) ABSTRACT

A method is for visually displaying quantitative information in medical imaging data records, in which an image data record and/or one or more additional data records, in which each image element of the image data record has one or more associated values as quantitative information, are obtained from one or more measurement data records after one or more processing steps. The image data record and/or the one or more additional data records is/are used to calculate a significance function which, for each image element in a prescribable image region, represents a degree of similarity between the one or more values associated with the image element and a prescribable value or a prescribable value combination. Further, the significance function is graphically displayed on an image reproduction unit. The present method can be used for visually displaying quantitative information contained in medical imaging data records easily and clearly.

20 Claims, 3 Drawing Sheets

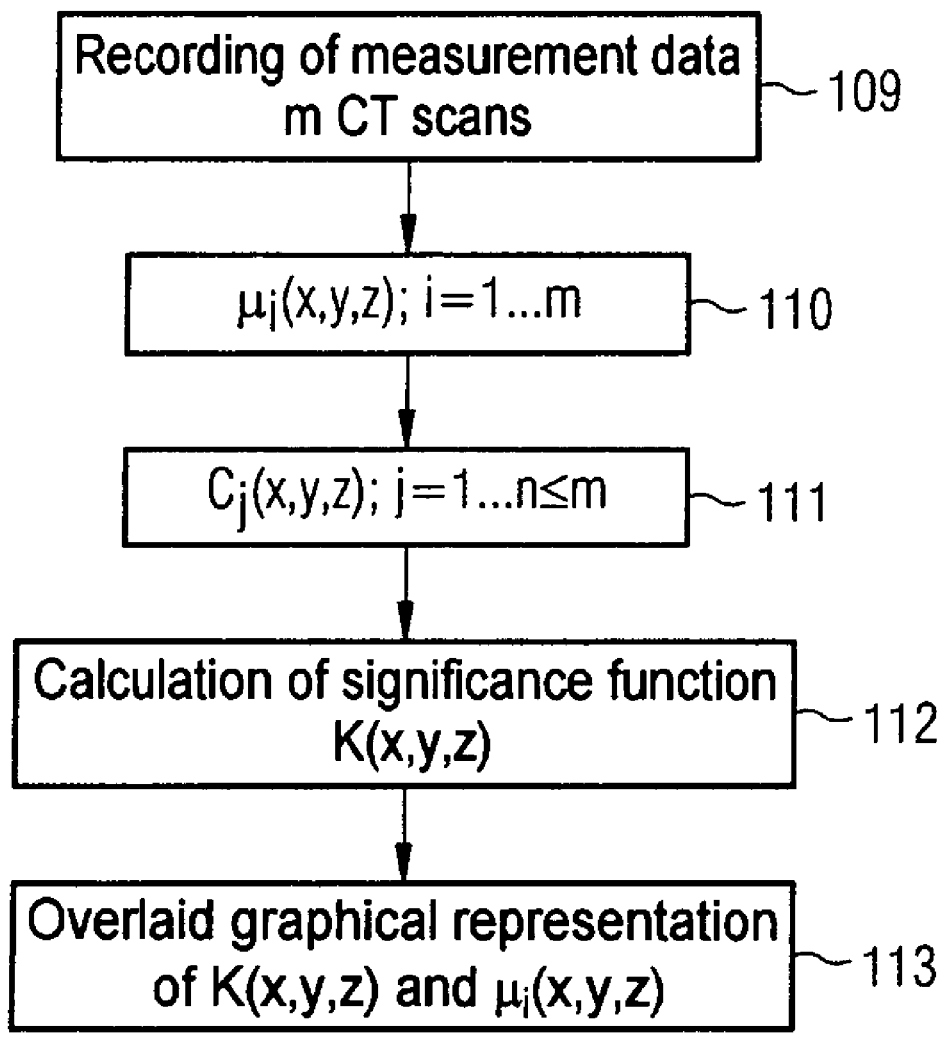

METHOD FOR VISUALLY DISPLAYING QUANTITATIVE INFORMATION IN MEDICAL IMAGING DATA RECORDS

The present application hereby claims priority under 35 U.S.C. §119 on German patent application numbers DE 10 2004 008 519.6 filed Feb. 20, 2004, the entire contents of which is hereby incorporated herein by reference.

FIELD OF THE INVENTION

The present invention generally relates to a method for visually displaying quantitative information in medical imaging data records. More particularly, it relates to a method for visually displaying quantitative information in CT data records; in which an image data record is obtained from one or more measurement data records after one or more processing steps.

BACKGROUND OF THE INVENTION

Medical imaging produces large volumes of data in data records which, following further processing, are displayed to the user as image information for a region under examination on the examined object. The data obtained using the imaging methods frequently also contain further information which may be of value to the user. This is explained in more detail below using the example of radiographical methods, particularly of X-ray computed tomography (CT).

The result of radiographical methods, such as computed tomography, mammography, and angiography, X-ray inspection engineering or comparable methods, is first of all the representation of the linear attenuation of an X-ray along its path from the X-ray source to the X-ray detector in a projection image.

This linear attenuation is caused by the irradiated materials along the ray path, which means that the linear attenuation can also be understood as a linear integral over the linear attenuation coefficients of all of the volume elements (voxels) along the ray path.

Particularly in the case of tomographical methods such as X-ray computed tomography, reconstruction methods can be used to calculate back from the projected linear attenuation data to the linear attenuation coefficients $\mu$ of the individual voxels and hence to obtain a significantly more sensitive examination than in the case of pure observation of projection images.

To represent the linear attenuation distribution, a value which is normalized to the linear attenuation coefficient of water and is called the "CT number" is normally used instead of the linear attenuation coefficient. This is calculated from a linear attenuation coefficient $\mu$ currently ascertained through measurement and from the reference linear attenuation coefficient $\mu_{H2O}$ according to the following equation:

$$C = 1000 \times \frac{\mu - \mu_{H2O}}{\mu_{H2O}} \, [HU]$$

with the CT number C in the unit Hounsfield [HU]. For water, a value $C_{H2O}=0$ HU is obtained, and for air a value $C_L=-1000$ HU. Since the two representations can be transformed into one another or are equivalent, the generally chosen term linear attenuation value or linear attenuation coefficient refers both to the linear attenuation coefficient $\mu$ and to CT value below.

The linear attenuation value for an X-ray scan cannot be used to infer the material composition of an object under examination, however, since the X-ray absorption is determined both by the effective ordinal number for the material and by the material density.

Materials or tissue of different chemical and physical composition may therefore have identical linear attenuation values on the X-ray image.

B. J. Heismann et al., Density and Atomic Number Measurements with Spectral X-Ray Attenuation Method, J. of Appl. Phys., Vol. 94, No 3, 2003, 2073-2079 and German patent application DE 101 43 131 A1 disclose a method in which at least two data records from the same region under examination are recorded with different spectral distribution of the X-ray radiation and/or X-ray detection. Using the spectral information, it is then possible to calculate the spatial distribution of the density $\rho(r)$ and of the effective ordinal number $Z(r)$ in the region under examination, also referred to as $\rho$-Z projection below, from the measurement data records. From combined evaluation of the distribution of the density and of the effective ordinal number it is possible to determine body constituents such as iodine or the like quantitatively and, by way of example, to segment out calcifications based on the ordinal number.

Further techniques for using the spectral information in the two measurement data records are known from the subsequently published documents DE 103 11 628 and DE 103 47 971, the entire contents of each of which are hereby incorporated herein by reference.

The potential opportunities for using the quantitative information contained in the data records give rise to the problem of suitable representation of the results, so that the user of the imaging system obtains the sometimes complex quantitative information in an easily diagnosable representation.

DE 101 27 573 A1 relates to a method for the combined representation of morphology and dynamics in the case of sectional-image and volumetric-image methods. The object of this method is to reduce the radiation load for a scan sequence in an imaging method based on X-ray radiation. In this context, at least two images of different phases of the corresponding tissue are recorded. Next, the at least two images are added in anatomical agreement in order to obtain the morphology of the tissue. In a further step, the difference between the images is calculated and the alterations are color coded. In this color-coded representation, changes over time can be visually detected immediately.

SUMMARY OF THE INVENTION

An embodiment of the present invention includes a method for visually displaying quantitative information in medical imaging data records in comprehensible fashion.

In the present method, in one embodiment, for visually displaying quantitative information in medical imaging data records, particularly in CT data records, an image data record and possibly one or more additional data records are obtained from one or more measurement data records after one or more processing steps. In the image data record and/or the one or more additional data records, each image element of the image data record, i.e. each pixel or voxel, has one or more associated values as quantitative information.

These values may firstly be linear attenuation values or intensity values for the image data record, for example, and may secondly also be density, concentration or ordinal number values for the additional data records, for example.

In the method of one embodiment, the image data record and/or the one or more additional data records is/are used to calculate a function which, for each image element in a prescribed image region comprising a plurality of image elements, represents a degree of similarity between the one or more values or value combinations associated with the image element and a value which can be prescribed for the image region or a value combination which can be prescribed for the image region, and the function is graphically displayed on an image reproduction unit.

The function introduced in the case of the present method of one embodiment, subsequently referred to as a significance function, may, depending on the dimension of the measurement data record or of the measurement data records, be a two-dimensional function $K(x,y)$ or a three-dimensional function $K(x,y,z)$ or $K(r)$ which assumes a value which is dependent on the location x, y, z of the image element. This significance function is used to calculate the degree of similarity between the value of the image data or data derived therefrom at each pixel or voxel and a prescribable value or a prescribable value combination—when a plurality of data records are involved. In the simplest case, this involves a simple comparison between two values, with the value of the significance function at this point corresponding to the comparison result or a value derived therefrom. In this case, the significance function $K(x,y,z)$ is preferably normalized.

Images are then shown on an appropriate image reproduction unit in graphical form, for example by coding the values of the significance function using the degree of color saturation in a color representation, or, in the case of a grayscale representation, using the degree of brightness of each image element. Preferably, this representation of the significance function is overlaid at the same location as the representation of an ordinary (linear attenuation value) image of the region under examination, as is obtained with the respective measurement methods.

In this way, by appropriately prescribing the comparison values or value combinations, for example a particular density or a particular ordinal number, it is immediately possible to locate the regions which contain a material having these properties, i.e. the significance function indicates the greatest similarity to the prescribed values. In this case, the prescribed values or value combinations depend firstly on the type of measurement and secondly on the desired information which the user wishes to obtain from the measurement data as comprehensibly as possible. The graphical representation of the significance function, possibly as an overlay with the normal image, converts sometimes complex quantitative information into an easily diagnosable representation. The present discrimination method using the significance function produces a novel form of representation for quantitative and functional information in medical imaging, particularly in X-ray computed tomography.

Embodiments of the present invention are explained in more detail below with reference to X-ray computed tomography. However, it may also be readily transferred to other areas of imaging medical engineering in which appropriate evaluatable information is held in the data records. When the present method of an embodiment is used for visually displaying quantitative information in CT data records, a CT data record is first of all recorded from a region under examination on an object using a tomograph. In this context, the recording can be made in a known fashion, for example as a sequence, as a spiral scan, statically or else as a topogram. For information about the density and ordinal-number distribution, at least two scans with different spectral distribution are recorded, as is known from the prior art cited at the outset.

Next, the one or more measurement data records, i.e. the measured raw data, are converted into a CT image data record $I(x,y,z)$. The technology used for this may be "filtered back-projection", for example, as is customary in this field. If appropriate, the $\rho$-Z projection cited in the introduction to the description or another method for generating derived measured variables from the measurement may additionally be used. Hence, at least one image data record $I(x,y,z)$ is obtained in this processing step.

From the one or more data records obtained, a significance function $K(x,y,z)$ is then calculated which has the following properties: the significance function indicates the similarity between the quantitative values in the CT images $I(x,y,z)$ or else in the distributions $\rho(x,y,z)$, $Z(x,y,z)$ derived therefrom or in the case of a derived concentration distribution $c_i(x,y,z)$ for a prescribed value or value vector. As the result, it is possible to obtain, following normalization, for example, $K(x,y,z)=1$ for a perfect match and $K(x,y,z)=0$ for no match between the compared values.

BRIEF DESCRIPTION OF THE DRAWINGS

The present method is explained in more detail below once again with reference to exemplary embodiments in conjunction with the drawings, in which:

FIG. 4 shows a third example of a method cycle based on an embodiment of the invention.

DETAILED DESCRIPTION OF THE EXEMPLARY EMBODIMENTS

Figure 1:
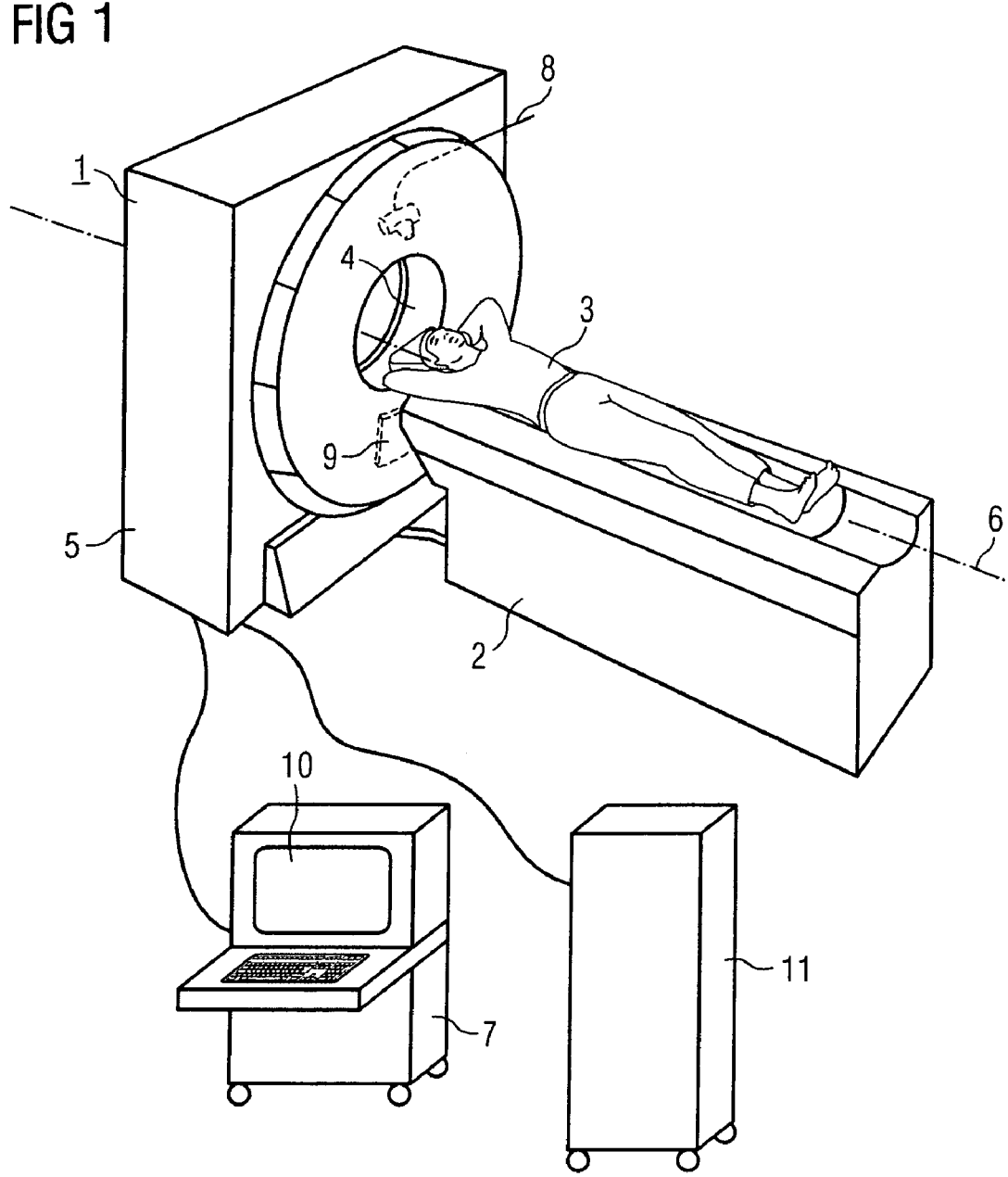
FIG. 1 shows an example of an X-ray CT appliance for carrying out an embodiment of the present method.

FIG. 1 shows an X-ray computed tomograph 1 having an associated supporting device 2 for holding and supporting a patient 3. A moving table top on the supporting device 2 can be used to insert the patient 3 with the desired region under examination into an opening 4 in the housing 5 of the CT appliance 1. In the case of a spiral scan, the supporting device 2 is also used to effect continuous axial feed. Inside the housing 5, a gantry (which cannot be seen in FIG. 1) can be rotated about an axis of rotation 6 running through the patient 3 at high speed. The figure also shows the recording system with the X-ray tube 8 and the X-ray detector 9.

For operation of the CT appliance 1 by a doctor or the like, a control unit 7 is provided which also includes a monitor 10 for showing the recorded images.

The projection data from the recording system, which scans continuously during a spiral scan, are processed further in a control and image computer 11 in line with the present method, and the computer includes a suitable processing module for this purpose. In this context, an image reconstruction algorithm is used to calculate the desired CT image, the significance function for conversion into a corresponding graphical representation and possibly density or ordinal-number distributions. The images calculated in the control and image computer 11 are then displayed on the monitor 10 of the control unit 7.

Figure 2:
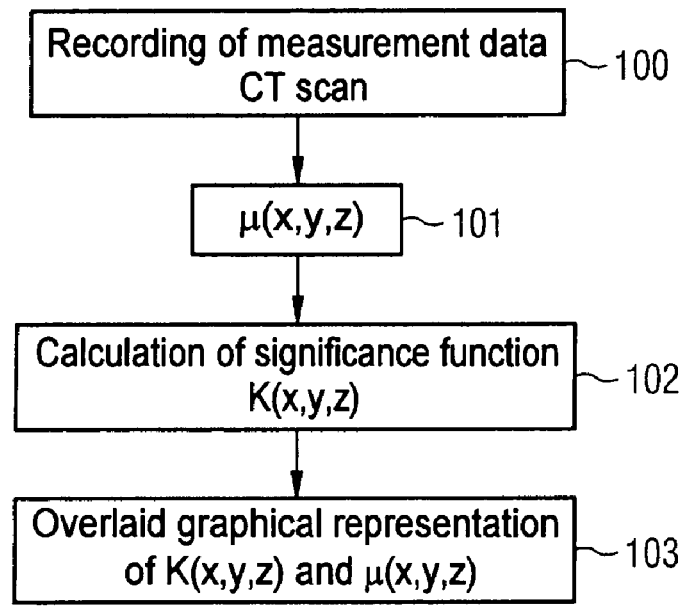
FIG. 2 shows a first example of a method cycle based on an embodiment of the invention.

FIG. 2 shows a first example for implementing the present method. In this context, in a first step 100 a CT data record for a region under examination on an object is captured using a spiral scan. In step 101 the distribution $\mu(x,y,z)$ of the X-ray linear attenuation coefficients is calculated from the CT data record using the technique of filtered back-projection.

Next, a prescribed significance function K(x,y,z), which in the present example is intended to provide an indication of the measure of calcification within the region under examination, is calculated in step 102.

For this, the "Agatston Score" is used, which describes the danger level of coronary calcium plaque. This is put into calcification classes in line with the HU value, with very low or very high calcification being regarded as rather low risk, but medium calcification levels being regarded as dangerous.

For the significance function used in the present example, the critical comparison value used is therefore a scalar, for example, such as μ=130 HU. In this example, the significance function K with linear weighting may then be as follows:

$$K = f \text{ for } f > 0, K = 0 \text{ otherwise},$$

with $f = 1 - abs(\mu - 130\ HU)/10\ HU$.

This significance function is calculated for the examined region's entire volume covered by the CT data record from the calculated linear attenuation data μ(x,y,z) or else just from a region of interest in this data record which has been marked by the user. In step 103, this significance function K(x,y,z) is then shown on the monitor of the CT appliance. In this context, the significance function is shown in color, with the degree of color saturation corresponding to the magnitude of the K value on the respective pixel shown.

As a result of this graphical representation of the significance function being overlaid with the representation of the CT image of the linear attenuation value distribution, the viewer is immediately able to identify whether and at what position there are dangerous calcification levels.

Thus, by way of example, a position with a dangerous level of calcification may be discernible by an intense red dot, which signifies an almost perfect match with the prescribed nominal value —in the present example 130 HU. A gradual loss of color down to a transparent dot indicates a lesser to nonexistent match (K=0).

Figure 3:
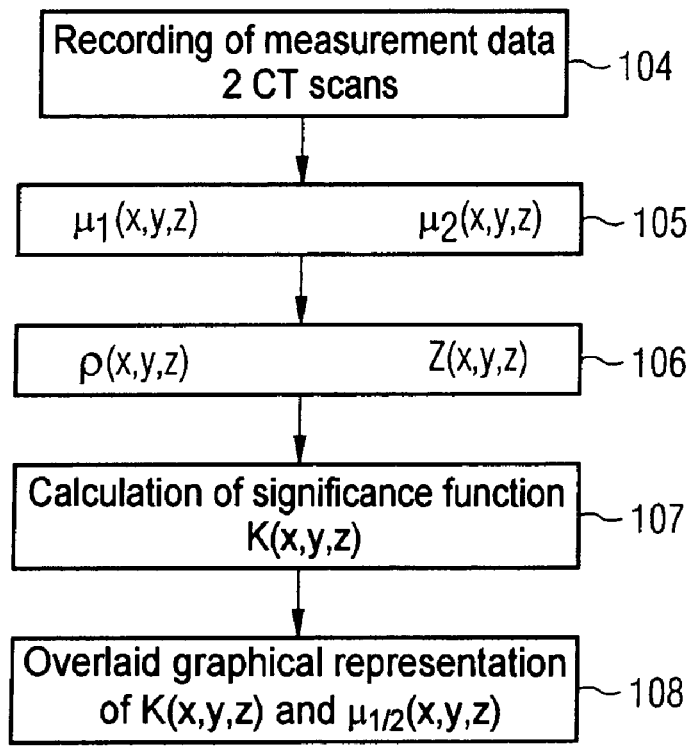
FIG. 3 shows a second example of a method cycle based on an embodiment of the invention.

In a second example, as illustrated by FIG. 3, 2 CT data records are first of all captured with different spectral distribution of the X-ray radiation passing through the object under examination. In this context, in the present example the X-ray tube's voltage is altered between the two CT scans. When the two CT data records have been captured in step 104, two linear attenuation value distributions $\mu_1(x,y,z)$ and $\mu_2(x,y,z)$ are calculated from the two data records using filtered back-projection (step 105).

In the subsequent step 106, the density distribution ρ(x,y,z) and the distribution of the effective ordinal number Z(x,y,z) are calculated from the two linear attenuation value distributions. The method used for this is known from DE 101 43 131 A1, for example, whose disclosure content is incorporated herein by reference in its entirety, especially that relating to the calculation of the density and ordinal-number distribution.

This ρ-Z projection carried out in step 106 delivers value pairs ρ(x,y,z), Z(x,y,z) for each voxel of the region under examination, the value pairs allowing precise characterization of a body constituent. Hence, with a value pair of Z=7.56, ρ=1.045 g/cm³, for example, it is highly probable that there is a volume of blood in a voxel. In the present example, the presence of such volumes of blood is intended to be visually displayed in a graphical representation. For this reason, a significance function K based on the following comparison values is calculated, for example:

$$K = f \text{ for } f > 0, K = 0 \text{ otherwise},$$

with $f = 1 - \sqrt{((Z_{meas} - Z_{nominal})^2 / Z_{scal} + (\rho_{meas} - \rho_{nominal})^2 / \rho_{scal})},$ where $Z_{scal}$ and $\rho_{scal}$ are square normalization and weighting factors.

When this significance function (which represents a measure of a similarity to the value pair for the presence of a volume of blood for each voxel) has been calculated in step 107, the significance function is graphically displayed on a monitor in the same way as already in the preceding example (step 108). The viewer is thus immediately able to identify blood vessels or hemorrhages within the volume under examination in the display.

Besides the representation of blood, it is naturally also possible to identify other body fluids in the region under examination on the basis of the associated value combinations of density and ordinal number. In this context, it is possible to calculate a plurality of significance functions, in each case for a match with the corresponding value pair, and to display them in different colors. This may be done using color representation, for example, in which the color red is used for blood, the color blue is used for hydropexis, the color green is used for urine, the color yellow is used for pus etc. As a result of the color representation of the significance functions being overlaid with the original CT data in grayscale representation, i.e. for the distribution of the linear attenuation coefficients, the additional information ascertained can thus be identified by the observer at one glance.

The third example shows a refinement of the method in which the concentration of individual elements or element compounds in the volume under examination can be visually displayed in the graphical representation shown. To this end, a plurality of digital X-ray images are recorded using a different tube voltage in step 109 in order to obtain a plurality of different CT data records. For each of the m data records, the linear attenuation value distribution $\mu_i(x,y,z)$ is calculated in step 110. In step 111, concentrations $$c_j = \sum_i^m M_{ij}^{-1} \mu_i$$

are then calculated from these linear attenuation data.

For this calculation, use is made of the fact that a linear attenuation coefficient μ for an element which (coefficient) has been measured using an X-ray absorption method is dependent on the spectral equipment function w(E) of the X-ray installation used and on the absorption spectrum κ(E) of the element:

$$\mu = \int \kappa(E) w(E) dE$$

where the spectral equipment function w(E) is obtained from the emitted X-ray spectrum S(E) and from the spectral detector sensitivity D(E), with 0<D(E)<1, in the following manner:

$$w(E) = \frac{S(E) \cdot D(E)}{\int S(E) \cdot D(E) dE}$$

When there are n different elements or element combinations, this relationship can be shown in matrix notation, when measuring m linear attenuation values μ obtained with the different spectral distributions, as follows:

$$\begin{pmatrix} \mu_1 \\ \ldots \\ \ldots \\ \mu_m \end{pmatrix} = \mu_i = \sum_j^n c_j M_{ij} \text{ with } M_{ij} = \int_E w_i(E) \Box_j(E) dE \qquad 5$$

This relationship can be used to ascertain a maximum of $n \leq m$ element concentrations from the measured data, with $\mu_i$ corresponding to the m measured linear attenuation values $i=1$ to m and $w_i$ corresponding to the spectral equipment function of the i-th spectral measurement channel, i.e. of the i-th spectral distribution. $\kappa_j(E)$ represents the spectral absorption spectrum of the respective chemical element or of the element combination, which absorption spectrum is known from the literature. The matrix notation shown can now be resolved according to the concentrations of the elements or element concentrations:

$$c_j = \sum_i^m M_{ij}^{-1} \mu_i$$

$M^{-1}_{ij}$ is the inverse matrix for $M_{ij}$, the inverse matrix being calculated from the equipment functions, i.e. $w_i(E)$, of the X-ray installation. This equation is taken as a basis for performing the concentration calculation from the measured local linear attenuation values $\mu_i$.

This method of concentration ascertainment delivers 2 to n dimensional maps of the concentration distribution in the measured object. In the present example, comparisons are made with chemical molecular formulae. If, by way of example, c1=concentration of hydrogen, c2=concentration of oxygen, then c1*2=c2 must hold true for volumes filled with water. This stipulation is then used to calculate the significance function:

$K=f$ for $f>0$, $K=0$ otherwise, with $f=1-abs(2*c1-c2)/c_{norm}$, where $c_{norm}$ corresponds to a normalization factor. Other standards and nonlinear weightings for the intervals between the measured concentrations and the prescribed concentration, for example exponentially, can naturally also be implemented.

Following calculation of this significance function in step 112, it may in turn be graphically displayed in the same way as in the preceding exemplary embodiments (step 113).

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for visually displaying quantitative information in medical imaging data records in which an image data record is obtained from at least one measurement data records after at least one processing step, the method comprising:
    calculating a function using at least one of the image data record and at least one additional data record over the image data record, wherein the function represents, for each image element in a prescribed image region including a plurality of image elements, a degree of similarity between at least one value or value combinations associated with the image element in the at least one image data record and at least one additional data record as quantitative information and a value prescribable for the image region or a value combination prescribable for the image region; and
    displaying the function graphically on an image reproduction unit.

2. The method as claimed in claim 1, wherein the function is displayed in color, with the degree of color saturation corresponding to the degree of similarity.

3. The method as claimed in claim 2, wherein the graphical representation of the function is overlaid on a graphical representation of the image data record.

4. The method as claimed in claim 3, wherein the prescribable value or the prescribable value combination corresponds to particular material properties of the object under examination within the prescribed image region.

5. The method as claimed in claim 4, wherein the additional data records are obtained by calculating a density distribution and a distribution for the effective ordinal number from at least two measurement data records which have different spectral weightings.

6. The method as claimed in claim 5, wherein the prescribable value combinations include a combination of a density value and of a value for the effective ordinal number.

7. The method as claimed in claim 1, wherein the graphical representation of the function is overlaid on a graphical representation of the image data record.

8. The method as claimed in claim 1, wherein the prescribable value or the prescribable value combination corresponds to particular material properties of the object under examination within the prescribed image region.

9. The method as claimed in claim 8, wherein the additional data records are obtained by calculating a concentration distribution for elements or element compounds from a plurality of measurement data records which have different spectral weightings.

10. The method as claimed in claim 9, wherein the prescribable values or value combinations include concentration values for elements or element compounds or comprise a combination of concentration values for different elements or element compounds.

11. The method as claimed in claim 10, wherein a plurality of different functions are calculated from at least one of the image data record and the at least one additional data record and are graphically displayed distinguishably on the image reproduction unit.

12. The method as claimed in claim 1, wherein the additional data records are obtained by calculating a density distribution and a distribution for the effective ordinal number from at least two measurement data records which have different spectral weightings.

13. The method as claimed in claim 12, wherein the prescribable value combinations include a combination of a density value and of a value for the effective ordinal number.

14. The method as claimed in claim 1, wherein the additional data records are obtained by calculating a concentration distribution for elements or element compounds from a plurality of measurement data records which have different spectral weightings.

15. The method as claimed in claim 14, wherein the prescribable values or value combinations include concentration values for elements or element compounds or comprise a combination of concentration values for different elements or element compounds.

16. The method as claimed in claim 1, wherein a plurality of different functions are calculated from at least one of the image data record and the at least one additional data record and are graphically displayed distinguishably on the image reproduction unit.

17. The method of claim 1, wherein the method is for visually displaying quantitative information in CT data records.

18. A method for displaying information in medical imaging data records, the method comprising:

calculating a function using at least one of an image data record and at least one additional data record, wherein the function represents, for each image element in a region including a plurality of image elements, a degree of similarity between at least one value or value combinations associated with the image element and a value prescribable for the image region or a value combination prescribable for the image region; and displaying the function.

19. The method as claimed in claim 18, wherein the function is displayed in color, with the degree of color saturation corresponding to the degree of similarity.

20. The method as claimed in claim 18, wherein the display includes a graphical representation of the function overlaid on a graphical representation of the image data record.

* * * * *